(12) United States Patent
Shiromoto et al.

(10) Patent No.: US 6,693,140 B2
(45) Date of Patent: Feb. 17, 2004

(54) CONTAINER COMPRISING FOAMED OLEFIN RESIN AND PROCESS FOR PRODUCING SAME

(75) Inventors: Seiji Shiromoto, Chiba (JP); Haruyuki Suzuki, Chiba (JP); Akinobu Sakamoto, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 360 days.

(21) Appl. No.: 09/798,907

(22) Filed: Mar. 6, 2001

(65) Prior Publication Data
US 2001/0031328 A1 Oct. 18, 2001

(30) Foreign Application Priority Data
Mar. 15, 2000 (JP) .......................... 2000-072013

(51) Int. Cl.⁷ .............................. C08F 110/00
(52) U.S. Cl. ....................... 521/142; 521/143
(58) Field of Search ................... 521/142, 143

(56) References Cited

U.S. PATENT DOCUMENTS

| | | | | |
|---|---|---|---|---|
| 4,352,892 A | * | 10/1982 | Lohmar | 521/79 |
| 6,232,355 B1 | * | 5/2001 | Malwitz et al. | 521/79 |
| 6,300,386 B1 | * | 10/2001 | Karukaya et al. | 521/137 |
| 6,518,320 B1 | * | 2/2003 | Malwitz et al. | 516/203 |

FOREIGN PATENT DOCUMENTS

JP  11-181136  7/1999

* cited by examiner

Primary Examiner—John M. Cooney, Jr.
(74) Attorney, Agent, or Firm—Sughrue Mion, PLLC

(57) ABSTRACT

There are disclosed:

(1) a container comprising a foamed olefin resin, wherein weight W (g) and content volume V (ml) of the container satisfy the following expression (1):

$$W(g)/V(ml) \leq 0.055 \qquad (1),$$

and (2) a process for producing the container by a blow molding method.

3 Claims, No Drawings

CONTAINER COMPRISING FOAMED OLEFIN RESIN AND PROCESS FOR PRODUCING SAME

FIELD OF THE INVENTION

The present invention relates to a container comprising a foamed olefin resin, and a process for producing same.

BACKGROUND OF THE INVENTION

Although a container comprising a foamed olefin resin is extensively used for articles such as detergents, medicines, drinks and foods, it is desired to develop a container comprising a foamed olefin resin, which container is light in its weight per content volume.

SUMMARY OF THE INVENTION

It is an object of the present invention to provide a container comprising a foamed olefin resin, which container is light in its weight per content volume, and has enough rigidity to use practically.

It is another object of the present invention to provide a process for producing such a container.

The present invention provides a container comprising a foamed olefin resin, wherein weight W (g) and content volume V (ml) of the container satisfy the following expression (1):

$$W(g)/V(ml) \leq 0.055 \quad (1).$$

The present invention also provides a process for producing a container comprising a foamed olefin resin, which comprises the steps of:

(1) extruding a composition comprising an olefin resin and an expanding agent with an extruder to form a parison comprising a foamed olefin resin, (2) setting the parison in a mold having a shape of the container, which mold is installed in a blow molding machine, (3) blowing a gas having a pressure of from 0.01 to 3 kg/cm$^2$ to both the outside surface of the parison and the inside surface thereof to cool the surfaces of the parison, (4) blowing a gas having a pressure of from 2 to 10 kg/cm$^2$ to the inside of the parison to expand and cool the parison, until the outer wall of the parison reaches the inner wall of the mold, and (5) taking out the resulting container comprising a foamed olefin resin from the mold.

DETAILED DESCRIPTION OF THE INVENTION

The weight (W) and content volume (V) of the container in accordance with the present invention satisfy the above-defined expression (1), preferably satisfy the following expression (2), and more preferably satisfy the following expression (3).

$$0.012 \leq W(g)/V(ml) \leq 0.050 \quad (2)$$

$$0.017 \leq W(g)/V(ml) \leq 0.045 \quad (2)$$

A thickness of the body of the container in accordance with the present invention is preferably from 0.2 to 3 mm, and more preferably from 0.4 to 2 mm from a viewpoint of accomplishing more effectively the objects of the present invention.

An expansion ratio of the container in accordance with the present invention is preferably from 1.1 to 5 times, and more preferably from 1.2 to 4.5 times.

While rigidity of a container, namely toughness thereof, generally depends greatly upon a thickness of the body of the container, a container in accordance with the present invention has a higher rigidity than a non-foamed container having the same weight and volume as the container in accordance with the present invention, because the body of the container in accordance with the present invention is greater in its thickness.

The "olefin resin" used in the present invention means a thermoplastic resin containing not less than 50% by mol of a structure unit derived from an olefin (hereinafter referred to as "olefin unit") and less than 50% by mol of a structure unit derived from a comonomer other than the olefin, which comonomer is copolymerizable with the olefin. Examples of the olefin resin are olefin homopolymers, copolymers containing at least two olefin units only, and copolymers containing at least one olefin unit and a structure unit derived from a comonomer other than the olefin, which comonomer is copolymerizable with the olefin.

Preferred examples of the olefin are ethylene; an α-olefin having 3 to 12 carbon atoms such as propylene, 1-butene, 1-pentene, 4-methyl-1-pentene, 1-hexene, 1-octene and 1-decene; and a vinylcycloalkane such as vinylcyclohexane and vinylcyclopentane.

Examples of the comonomer other than the olefin are a conjugated diene such as butadiene and isoprene; a non-conjugated diene such as 1,4-pentadiene; acrylic acid; an acrylic acid ester such as methyl acrylate and ethyl acrylate; methacrylic acid; a methacrylic acid ester such as methyl methacrylate and ethyl methacrylate; and vinyl acetate.

Preferred olefin resins are those having a propylene unit. Of these, a propylene homopolymer and a block copolymer of propylene and ethylene are preferred.

A particularly preferred propylene homopolymer is that (hereinafter referred to as "propylene resin (A)", cf. JP-A 11-228629) obtained by a process comprising the steps of:

(1) homopolymerizing propylene to obtain a crystalline polymer (a) having an intrinsic viscosity of not less than 5.0 dl/g, and (2) homopolymerizing propylene in the presence of the polymer (a) obtained in the above step (1) to further produce a crystalline polymer (b) having an intrinsic viscosity of less than 3.0 dl/g, thereby obtaining the propylene resin (A).

Here, it is important to satisfy the following conditions (i) to (iii) at the same time:

(i) an amount of the polymer (a) contained in the propylene resin (A) is from 0.05 to 25% by weight, provided that an amount of the propylene resin (A) is assigned to be 100% by weight, (ii) an intrinsic viscosity of the propylene resin (A) is less than 3.0 dl/g, and (iii) a molecular weight distribution of the propylene resin (A) is less than 10.

The above-mentioned "block copolymer of propylene and ethylene" means a copolymer obtained by a process comprising the steps of:

(1) polymerizing propylene or a mixture of propylene and ethylene to obtain a propylene homopolymer or propylene/ethylene copolymer containing an ethylene unit of from 0 to 2% by weight, wherein an amount of the propylene homopolymer or propylene/ethylene copolymer is from 70 to 90% by weight, provided that an amount of the desired block copolymer of propylene and ethylene is assigned to be 100% by weight, and (2) copolymerizing propylene and ethylene in the presence of the homopolymer or copolymer obtained in the above step (1) to further produce a propylene/ethylene copolymer containing an ethylene unit of from 10 to 50% by weight, thereby obtaining the block copolymer of propylene and ethylene.

A preferred combination of the olefin resin used in the present invention is (i) a combination of from 1 to 100% by weight of the above-mentioned propylene resin (A) with from 99 to 0% by weight of the above-mentioned block copolymer of propylene and ethylene containing an ethylene unit of from 1 to 10% by weight, and (ii) a combination of from 1 to 100% by weight of the above-mentioned propylene resin (A) with from 99 to 0% by weight of the propylene homopolymer, provided that the sum of two components in each combination is 100% by weight.

A container in accordance with the present invention can be produced by a process comprising the steps of:

(1) extruding a composition comprising an olefin resin and an expanding agent with an extruder to form a parison comprising a foamed olefin resin, (2) setting the parison in a mold having a shape of the container, which mold is installed in a blow molding machine, (3) blowing a gas having a pressure of from 0.01 to 3 kg/cm$^2$ to both the outside surface of the parison and the inside surface thereof to cool the surfaces of the parison, (4) blowing a gas having a pressure of from 2 to 10 kg/cm$^2$ to the inside of the parison to expand and cool the parison, until the outer wall of the parison reaches the inner wall of the mold, and (5) taking out the resulting container comprising a foamed olefin resin from the mold.

The formation of the parison in the above step (1) is carried out at a temperature higher than a higher temperature between a melting point of the olefin resin and a decomposition temperature of the foaming agent. When said temperature is too high, a melt viscosity of the olefin resin and a viscosity of the parison obtained decrease, respectively, and as a result, the resulting cells in the parison are crushed by pressure of the gas in the succeeding step (4), and therefore it is not recommendable. In the step (1), it is permitted to blow a pressure gas into the inside of the parison to prevent deformation of the parison.

The above-mentioned step (3) is a step of cooling the surfaces of the parison by blowing a pressure gas to both the outside surface of the parison and the inside surface thereof to prevent the resulting cells in the parison from being crushed by pressure of the gas in the succeeding step (4). It is permitted to cool the outside surface of the parison by the pressure gas in the above-mentioned step (1) as well as the step (3). It is preferable to cool the whole surface of the parison uniformly. It is not preferable to cool the parison unevenly, because a thickness of the body of the container obtained may become uneven. It is not desired to use a gas of too low pressure, because, if so, the parison cannot be cooled sufficiently. It is not also desired to use a gas of too high pressure, because, if so, (1) the parison is extraordinarily cooled to cause solidification and interruption of expansion, (2) the parison is deformed, (3) a part of the parison is expanded to the inner wall of the mold to cause the cool solidification, or (4) a container having a rough surface is obtained. Preferred examples of the gas used in this step are air, nitrogen and carbon dioxide.

When pressure of the gas in the above-mentioned step (4) is too low, expansion of the parison becomes insufficient, and therefore it is not desired. Whereas, when pressure of the gas is too high, the resulting cells in the parison are crushed by pressure of the gas, and therefore it is not desired. Preferred examples of the gas used in this step are air, nitrogen and carbon dioxide.

An expansion ratio of the container obtained is preferably from 1.1 to 5 times, and more preferably from 1.2 to 4.5 times.

The expanding agent used in the present invention may be ones known in the art. Examples of the expanding agent are inorganic expanding agents such as ammonium carbonate, ammonium hydrogencarbonate, sodium hydrogencarbonate, sodium nitrite and sodium borohydride; azo expanding agents such as azodicarbonamide and azobisbutyronitrile; nitro expanding agents such as dinitrosopentamethylenetetramine and N,N'-dimethyl-N,N'-dinitrosoterephthalamide; hydrazine expanding agents such as p-toluenesulfonyl hydrazide and p,p'-oxybisbenzenesulfonyl hydrazide; semicarbazide expanding agents such as p,p'-oxybisbenzenesulfonyl semicarbazide. Of these, sodium hydrogencarbonate and azodicarbonamide are preferred. It is permitted to use a combination of at least two expanding agents mentioned above. A combination of 1 to 40% by weight of azodicarbonamide and 60 to 99% by weight of sodium hydrogencarbonate is particularly preferred, provided that the sum of said two components is assigned to be 100% by weight.

The expanding agent is used in an amount of usually from 0.01 to 10 parts by weight, preferably from 0.05 to 8 parts by weight, and more preferably from 0.1 to 5 parts by weight, based on 100 parts by weight of the olefin resin used. When the amount of the expanding agent is less than 0.01 part by weight, it may frequently happen that the expansion ratio becomes insufficient to make production of a light weight container difficult. Whereas, when the amount thereof exceeds 10 parts by weight, it may happen that the effect of the foaming agent is saturated to cause an extraordinary cost.

Usually, it is recommendable to use an expanding agent having a decomposition temperature of about 140 to about 180° C. With respect to an expanding agent having a decomposition temperature exceeding about 180° C., it is recommendable to use such an expanding agent in combination with an expanding auxiliary to lower the decomposition temperature to about 140 to about 180° C. Examples of the expanding auxiliary are zinc oxide, zinc nitrate, basic zinc carbonate, zinc stearate, zinc phthalate, lead carbonate, urea and glycerol.

The expanding auxiliary is used in an amount of preferably from 0.1 to 30% by weight, and more preferably from 1 to 20% by weight based on 100% by weight of the sum of the expanding agent and the expanding auxiliary.

In order to obtain a container having a light weight and high rigidity, it is recommendable to use the expanding agent in combination with an expanding nucleating agent, thereby generating a large quantity of cells having a small diameter. Examples of the expanding nucleating agent are inorganic fillers such as talc, silica, mica, calcium carbonate, calcium silicate, barium sulfate, amino silicate and diatomaceous earth; resin beads such as polymethyl methacrylate and polystyrene beads having a diameter of not more than 100 μm; and metal salts such as calcium stearate, magnesium stearate and zinc stearate. It is permitted to use the expanding nucleating agent in combination of two or more thereof.

The expanding nucleating agent is used in an amount of preferably from 0.01 to 20% by weight, more preferably from 0.1 to 15% by weight, and much more preferably from 0.3 to 10% by weight, based on 100% by weight of the olefin resin. When the amount of the expanding nucleating agent is less than 0.01% by weight, it may happen that the effect of the expanding nucleating agent cannot be obtained sufficiently. Whereas, when the amount thereof exceeds 10% by weight, it may happen that the effect of the expanding nucleating agent is saturated to cause an extraordinary cost.

The olefin resin may be used in combination with additives such as neutralizing agents, antioxidants, heat stabilizers, weather resisting agents, crystal nucleating agents, lubricants, ultraviolet ray absorbers, anti-static agents and fluorescent whitening agents; and coloring agents such as dyes and pigments, so long as the objects of the present invention are accomplished.

The container in accordance with the present invention can be subjected to, for example, silk screen printing, offset printing, shrink labeling, stretch labeling and in-mold labeling, thereby decorating the surface thereof. As such a decoration method, for example, there is enumerated a method wherein a label is placed in advance in the mold of the step (2) mentioned above, whereby the label can be stuck fast to the surface of the container. An in-mold labeled blow-molded container obtained by said method has no height difference between the surface of the label and that of the container to exhibit a superior appearance, and therefore it is a particularly preferred container.

The container in accordance with the present invention can be provided with a cap to be used as a capped container. In addition, the container can be cut at the body thereof to obtain a cup and a tray. The cup and tray can be provided with a cap, whereby they can be used as a preservation container.

The container such as a vessel and a bottle in accordance with the present invention can be used, for example, as containers for daily liquid necessaries such as shampoo, hairdressing liquids, cosmetics, detergents, disinfectants and bleaching agents; containers for liquid foods such as soft drinks, water, edible oil and seasonings; containers for solid foods such as frozen foods, precooked foods and dairy products; containers for microwave ovens; containers for other medicines and agricultural chemicals; and containers for liquids for industries.

EXAMPLES

The present invention is illustrated in more detail with reference to the following Examples, which are only illustrative and not intended to limit the scope of the present invention. Evaluation methods used are as follows.
1. Intrinsic viscosity (dl/g) of polymer
   Measured in 135° C. tetralin using an Ubbelohde's viscometer.
2. Melt flow rate (MFR: g/10 min.)
   Measured at 230° C. according to Condition Number 14 of JIS K7210.
3. Density (g/cm$^3$) and expansion ratio of container.
   Both were measured by underwater substitution method according to JIS K7112.

Reference Example 1 (Production of Propylene Resin (A))

(1) Production of Solid Catalyst Component
A 200 liter SUS reaction vessel equipped with a stirrer was purged with nitrogen, and thereafter 80 liters of hexane, 6.55 mol of tetrabutoxytitanium, 2.8 mol of di-i-butyl phthalate and 98.9 mol of tetraethoxysilane were fed therein to obtain a uniform solution.

Successively, 51 liters of a di-i-butyl ether solution of butylmagnesium chloride (concentration=2.1 mol/l) was added dropwise to the uniform solution over 5 hours while maintaining a temperature in the reaction vessel at 5° C. After completion of the addition, the mixture was stirred at room temperature for 1 hour. Thereafter, the solid produced was separated, and washed 3 times with each 70 liters of toluene.

Toluene was added to the solid washed to obtain a slurry of the solid product having a slurry concentration of 0.6 kg/l. A mixture of 8.9 mol of n-butyl ether and 274 mol of titanium tetrachloride was added to the slurry, and then 20.8 mol of phthalic chloride was further added. The resulting mixture was allowed to react with one another at 110° C. for 3 hours. After the reaction was over, the solid was separated and washed two times with toluene at 95° C.

Successively, after adjusting a slurry concentration to 0.6 kg/l, 3.13 mol of di-i-butyl phthalate, 8.9 mol of n-butyl ether and 137 mol of titanium tetrachloride were added to the slurry. The resulting mixture was allowed to react with one another at 105° C. for 1 hour. Thereafter, the resulting solid was separated at 105° C. and washed two times with each 90 liters of toluene at 95° C.

Successively, after adjusting a slurry concentration to 0.6 kg/l, 8.9 mol of n-butyl ether and 137 mol of titanium tetrachloride were added to the slurry. The resulting mixture was allowed to react with one another at 95° C. for 1 hour. Thereafter, the resulting solid was separated at 95° C. and washed three times with each 90 liters of toluene at 95° C.

Successively, after adjusting a slurry concentration to 0.6 kg/l, 8.9 mol of n-butyl ether and 137 mol of titanium tetrachloride were added to the slurry. The resulting mixture was allowed to react with one another at 95° C. for 1 hour. Thereafter, the resulting solid was separated at 95° C., washed three times with each 90 liters of toluene at 95° C., and further washed three times with each 90 liters of hexane. The solid washed was dried under reduced pressure to obtain 11.0 kg of a solid catalyst component.

The solid catalyst component obtained was found to contain 1.9 wt % of the titanium atom, 20 wt % of the magnesium atom, 8.6 wt % of the phthalic acid ester, 0.05 wt % of the ethoxy group and 0.21 wt % of the butoxy group. The solid catalyst component contained no fine powder and had a superior particle form.

(2) Pre-activation of Solid Catalyst Component
In a 3 litter SUS autoclave equipped with a stirrer, 1.5 liters of n-hexane thoroughly dehydrated and degassed, 37.5 mmol of triethylaluminum, 3.75 mmol of t-butyl-n-propyldimethoxysilane and 15 g of the solid catalyst component obtained in the above (1) were placed, and then 15 g of propylene was fed therein continuously over 30 minutes, while maintaining a temperature in the autoclave to 5 to 15° C.

(3) Production of Crystalline Polymer (a) (step (1))
In a 300 litter SUS polymerization vessel, liquefied propylene, triethylaluminum, t-butyl-n-propyldimethoxysilane and the pre-activated solid catalyst component obtained in the above (2) were fed continuously at 57 kg/h, 1.3 mmol/h, 0.13 mmol/h and 0.51 g/h, respectively. Propylene was polymerized continuously in the substantial absence of hydrogen at a polymerization temperature of 60° C. under polymerization pressure of 27 kg/cm$^2$G, thereby obtaining a polymer (a) at a production rate of 2.0 kg/h. A yield of the polymer (a) was 3920 g per g of the pre-activated solid catalyst component, and an intrinsic viscosity of the polymer (a) was 7.7 dl/g.

(4) Production of Crystalline Polymer (b) (step (2))
In a 1 m$^3$ fluidized bed reactor equipped with a stirrer, a polymer slurry containing the polymer (a) obtained in the above step (1) (at 2.0 kg/h) and liquefied propylene (55 kg/h) was fed continuously. Further, hydrogen, triethylaluminum and t-butyl-n-propyldimethoxysilane were fed continuously at 0.15 kg/h, 60 mmol/h and 6 mmol/h, respectively. Propylene was polymerized continuously at a polymerization temperature of 80° C. under polymerization pressure of 18 Kg/cm$^2$ G and at a hydrogen concentration of the gas phase of 8% by volume, thereby obtaining a powder propylene polymer (A) comprising the polymer (a) and the polymer (b) at a production rate of 18.2 kg/h. An intrinsic viscosity of the propylene polymer (A) was 1.9 dl/g.

From the above results, there were calculated as follows:
(a) a yield of the polymer (b)=31760 g per g of the pre-activated solid catalyst component,
(b) a production ratio between the polymer (a) and the polymer (b)(polymer (a):polymer (b))=11:89, and
(c) an intrinsic viscosity of the polymer (b)=1.2 dl/g, wherein the calculation was conducted on the assumption that an additivity, "intrinsic viscosity of the polymer (a)×content of the polymer (a)+intrinsic viscosity of the polymer (b)×content of the polymer (b)=intrinsic viscosity of the propylene polymer (A)", is realized.

(5) Pelletization of Propylene Resin (A)

A mixture of 100 parts by weight of the above-mentioned propylene resin (A), 0.1 part by weight of calcium stearate, 0.05 part by weight of an antioxidant (Irganox 1010, a commercial name of Ciba Geigy), and 0.2 part by weight of an antioxidant (Sumilizer BHT, a commercial name of Sumitomo Chemical Co., Ltd.) was melt-kneaded at 230° C. to obtain pellets. MFR of the pellet was 12 g/10 min.

Reference Example 2 (Production of Master Batch of Expanding Nucleating Agent)

30 Parts by weight of a propylene/ethylene block copolymer (MFR=30 g/10 min; Noblen WP575A, a commercial name of Sumitomo Chemical Co., Ltd.) and 70 parts by weight of talc, MWHS-T, a commercial name of Hayashi Kasei K.K., were melt-kneaded to obtain a master batch of an expanding nucleating agent. The above-mentioned propylene/ethylene block copolymer was produced by a process comprising the steps of:

(1) homopolymerizing propylene until a content of the resulting propylene homopolymer reaches 85.5% by weight based on 100% by weight of the desired final product, namely the propylene/ethylene block copolymer, and (2) copolymerizing propylene and ethylene in the presence of the propylene homopolymer obtained in the above step to further produce a propylene/ethylene copolymer containing 40% by weight of an ethylene unit, thereby obtaining the final product, namely the propylene/ethylene block copolymer.

Example 1

A composition comprising 50.0 parts by weight of the propylene polymer resin (A) obtained in Reference Example 1, 50.0 parts by weight of a propylene homopolymer (MFR=3 g/10 min; Noblen H501, a commercial name of Sumitomo Chemical Co., Ltd.), and 2.0 parts by weight of a composite expanding agent, which agent contained 30% by weight of azodicarbonamide and 70% by weight of sodium hydrogencarbonate, was extruded at a die temperature of 180° C. and an out-put of 20 kg/h using a blow molding machine (Type NB3B; manufactured by The Japan Steel Works, Ltd.) having a 50 mm screw diameter, thereby obtaining a foamed hot parison, wherein the parison was cooled by blowing air of not more than 1 kg/cm² in its pressure to the inside thereof.

The hot parison was set in a mold kept at a temperature of 15° C., followed by blowing air of 1 kg/cm² in its pressure for 3 seconds therein from the upper opening of the hot parison, and followed by blowing air of 6 kg/cm² in its pressure for 15 seconds therein, thereby obtaining a narrow-mouthed elliptical foamed container having a 750 ml volume without any troubles. The container obtained was found to be 1.25 times in its expansion ratio, 0.72 g/cm³ in its density, 0.7 mm in its thickness and 32 g in its weight. The amounts (parts by weight) of respective components used are as shown in Table 1, and properties of the container obtained are as shown in Table 2.

Example 2

A composition comprising 50.0 parts by weight of the propylene polymer resin (A) obtained in Reference Example 1, 50.0 parts by weight of a propylene block copolymer (MFR=8 g/10 min; Noblen AW561, a commercial name of Sumitomo Chemical Co., Ltd.), 1.0 part by weight of the master batch of an expanding nucleating agent obtained in Reference Example 2, and 2.0 parts by weight of a composite expanding agent, which agent contained 30% by weight of azodicarbonamide and 70% by weight of sodium hydrogencarbonate, was molded in a manner similar to that of Example 1, thereby obtaining a foamed container without any troubles. The results are as shown in Tables 1 and 2.

Example 3

Example 2 was repeated, except that the amounts of the propylene polymer resin (A), the propylene block copolymer and the composite expanding agent were changed to 30.0 parts by weight, 70.0 parts by weight and 4.0 parts by weight, respectively, thereby obtaining a foamed container without any troubles. The results are as shown in Tables 1 and 2.

Comparative Example 1

Only the propylene block copolymer used in Example 2 was molded in a manner similar to that of Example 1, thereby obtaining a container. The results are as shown in Tables 1 and 2.

TABLE 1

| | Example 1 | Example 2 | Example 3 | Comparative Example 1 |
|---|---|---|---|---|
| Propylene resin (A) | 50.0 | 50.0 | 30.0 | — |
| Propylene homopolymer | 50.0 | — | — | — |
| Propylene block copolymer | — | 50.0 | 70.0 | 100.0 |
| Expanding agent | 2.0 | 2.0 | 4.0 | — |
| Master batch of expanding nucleating agent | — | 1.0 | 1.0 | — |
| (Expanding nucleating agent) | — | (0.7) | (0.7) | — |

TABLE 2

| | Example 1 | Example 2 | Example 3 | Comparative Example 1 |
|---|---|---|---|---|
| Expansion ratio | 1.25 | 1.34 | 1.38 | 1.00 |
| Density (g/cm³) | 0.72 | 0.68 | 0.66 | 0.90 |
| Thickness (mm) | about 0.7 | about 0.7 | about 0.7 | about 0.7 |
| Weight (g) | 32 | 30 | 28 | 44 |
| Volume (ml) | 750 | 750 | 750 | 750 |
| W (g)/V (ml) | 0.043 | 0.046 | 0.037 | 0.059 |

What is claimed is:

1. A container comprising a foamed olefin resin, wherein weight W (g) and content volume V (ml) of the container satisfy the following expression (1):

$$W(g)/V(ml) \leq 0.055 \tag{1}$$

2. The container according to claim 1, wherein a thickness of the body of the container is from 0.2 to 3 mm.

3. The container according to claim 1, wherein an expansion ratio of the container is from 1.1 to 5 times.

* * * * *